US012633555B2

(12) United States Patent　　(10) Patent No.:　US 12,633,555 B2

Kitchaev et al.　　　　　　　　　(45) Date of Patent:　May 19, 2026

(54) ELECTROCHEMICAL CELL MAGNETIC ELECTROCATALYST

(71) Applicant: Robert Bosch GmbH, Stuttgart (DE)

(72) Inventors: Daniil A Kitchaev, Brookline, MA (US); Nathan Craig, Sunnyvale, CA (US); Matthias Hanauer, Leonberg (DE); Ulrich Berner, Stuttgart (DE); Charles Tuffile, Swansea, MA (US)

(73) Assignee: Robert Bosch GmbH, Stuttgart (DE)

( * ) Notice: Subject to any disclaimer, the term of this patent is extended or adjusted under 35 U.S.C. 154(b) by 400 days.

(21) Appl. No.: 18/161,562

(22) Filed: Jan. 30, 2023

(65) Prior Publication Data

US 2024/0266567 A1　　Aug. 8, 2024

(51) Int. Cl.
H01M 8/04701　　(2016.01)
H01M 8/1006　　(2016.01)
H01M 8/10　　(2016.01)

(52) U.S. Cl.
CPC ..... H01M 8/04731 (2013.01); H01M 8/1006 (2013.01); H01M 2008/1095 (2013.01)

(58) Field of Classification Search
CPC ............................................ H01M 8/00–2495
See application file for complete search history.

(56) References Cited

U.S. PATENT DOCUMENTS

| | | |
|---|---|---|
| 5,817,221 A | 10/1998 | Leddy et al. |
| 5,981,095 A | 11/1999 | Leddy et al. |
| 6,355,166 B1 | 3/2002 | Amarasinghe et al. |
| 2002/0012821 A1 | 1/2002 | Leddy et al. |
| 2003/0086839 A1 | 5/2003 | Rivin |
| 2004/0018400 A1* | 1/2004 | Herman .................. H01M 8/02 |
| | | 429/10 |
| 2018/0290122 A1 | 10/2018 | O'Connor |
| 2020/0047166 A1 | 2/2020 | Bordet et al. |
| 2022/0298014 A1 | 9/2022 | Edwards |

FOREIGN PATENT DOCUMENTS

| | | |
|---|---|---|
| CN | 111740119 A | 10/2020 |
| CN | 111740119 B | 7/2021 |
| JP | 2007227209 A | 9/2007 |
| JP | 4443145 B2 | 3/2010 |
| WO | 2010120188 A1 | 10/2010 |

OTHER PUBLICATIONS

CN111740119A. Jul. 6, 2021. English machine translation by EPO. (Year: 2021).*

(Continued)

*Primary Examiner* — James Lee

(74) *Attorney, Agent, or Firm* — BROOKS KUSHMAN P.C.

(57)　　　ABSTRACT

An electrochemical cell includes a membrane, a catalyzed electrode facing the membrane, the electrode including a magnetic electrocatalyst in contact with an ionomer, an electromagnet, and a controller programmed to activate the electromagnet to form an oscillating magnetic field arranged to selectively increase temperature of the magnetic electrocatalyst, based on one or more conditions, to increase kinetics of a reaction at the catalyzed electrode or remove water from the electrode.

20 Claims, 5 Drawing Sheets

(56) References Cited

OTHER PUBLICATIONS

Pant, L. M., Gerhardt, M. R., Macauley, N., Mukundan, R., Borup, R. L., & Weber, A. Z. "Along-the-channel modeling and analysis of PEFCs at low stoichiometry: Development of a 1+ 2D model" Electrochimica Acta, 326, 134963. (2019).

Vetter, R., & Schumacher, J. O. "Experimental parameter uncertainty in proton exchange membrane fuel cell modeling. Part I: Scatter in material parameterization." Journal of Power Sources, 438, 227018. (2019).

Niether, C., Faure, S., Bordet, A., Deseure, J., Chatenet, M., Carrey, J., Chaudret, B., & Rouet, A. "Improved water electrolysis using magnetic heating of FeC—Ni core-shell nanoparticles" Nature Energy, 3(6), 476-483, (2018).

Rosen, D. J., Yang, S., Marino, E., Jiang, Z., & Murray, C. B. "In Situ EXAFS-Based Nanothermometry of Heterodimer Nanocrystals under Induction Heating" The Journal of Physical Chemistry C, (2022).

International Search Report dated Jun. 4, 2024 for related PCT Application No. PCT/IBd2024/050861.

International Preliminary Report on Patentability, dated Jul. 31, 2025 for related PCT Application No. PCT/IBd2024/050861.

* cited by examiner $$H_2O \longrightarrow 2H^+ + \tfrac{1}{2}O_2 + 2e^- \qquad \text{Anode}$$
$$2H^+ + 2e^- \longrightarrow H_2 \qquad \text{Cathode}$$
$$H_2O \longrightarrow H_2 + \tfrac{1}{2}O_2 \qquad \text{Total Reaction}$$

ELECTROCHEMICAL CELL MAGNETIC ELECTROCATALYST

TECHNICAL FIELD

The present disclosure relates to structure of an electrochemical cell including a magnetic electrocatalyst material and methods of using the same to accelerate reaction rates at catalyzed electrodes.

BACKGROUND

With an ever-increasing growing interest in green technologies worldwide, electrochemical cells such as fuel cells and electrolyzers are top candidates for various applications. Yet many challenges need to be resolved prior to widespread electrochemical cell implementation. Among the challenges is the rate of critical reactions which are catalyzed at the electrodes, especially the cathode.

SUMMARY

In one or more embodiments, an electrochemical cell is disclosed. The cell may include a membrane, a catalyzed electrode facing the membrane, the electrode including a magnetic electrocatalyst in contact with an ionomer, an electromagnet, and a controller programmed to activate the electromagnet to form an oscillating magnetic field arranged to selectively increase temperature of the magnetic electrocatalyst, based on one or more conditions, to increase kinetics of a reaction at the catalyzed electrode or remove water from the electrode. The magnetic electrocatalyst may include a ferromagnetic alloy. The electromagnet may be an alternating current magnet. The magnetic electrocatalyst may be dispersed within the electrode. The electrode may be a cathode. The cell may be a proton-exchange membrane fuel cell (PEMFC). The electrode may further include a non-magnetic electrocatalyst. The magnetic electrocatalyst may be an oxygen reduction reaction (ORR) catalyst.

In another embodiment, an electrochemical system is disclosed. The system may include a cell having an anode and a cathode separated by a membrane including an ionomer. The cathode may include a magnetic electrocatalyst, an electromagnet, and a controller programmed to operate the electromagnet, responsive to the cell output, to selectively increase, decrease, and/or maintain the electrocatalyst temperature to accelerate cathodic reactions. The magnetic electrocatalyst may be dispersed within the cathode in a uniform manner. The cathode may further include a non-magnetic electrocatalyst. The magnetic electrocatalyst may be an oxygen reduction reaction (ORR) catalyst. The magnetic electrocatalyst may include a ferromagnetic alloy. The selective temperature may include the increase and the increase generates one or more localized hot spots having a higher temperature than a remainder of the cell.

In yet another embodiment, an electrochemical cell is disclosed. The cell may include a selective hot-spot forming system including an electromagnet arranged to form an oscillating electromagnetic field, and an electrode arranged within a radius of the oscillating electromagnetic field and having a magnetic electrocatalyst material whose temperature depends on a status of the electromagnet such that when the electromagnet is activated, the oscillating electromagnetic field increases the temperature of the magnetic electrocatalyst material to a first temperature, forming one or more localized hot spots within the electrode, and when the electromagnet is deactivated, the oscillating electromagnetic field ceases to increase the temperature of the magnetic electrocatalyst material and the magnetic electrocatalyst material has a second temperature, the first temperature being higher than the second temperate. The first temperature may be higher than a temperature of an ionomer present in the cell. The first temperature value may be exclusive to the hot spots. The first temperature may be a predetermined temperature. The first temperature may cause increase of an oxygen reduction reaction (ORR) reaction rate. The electrode may be a cathode.

DETAILED DESCRIPTION

Figure 1A:
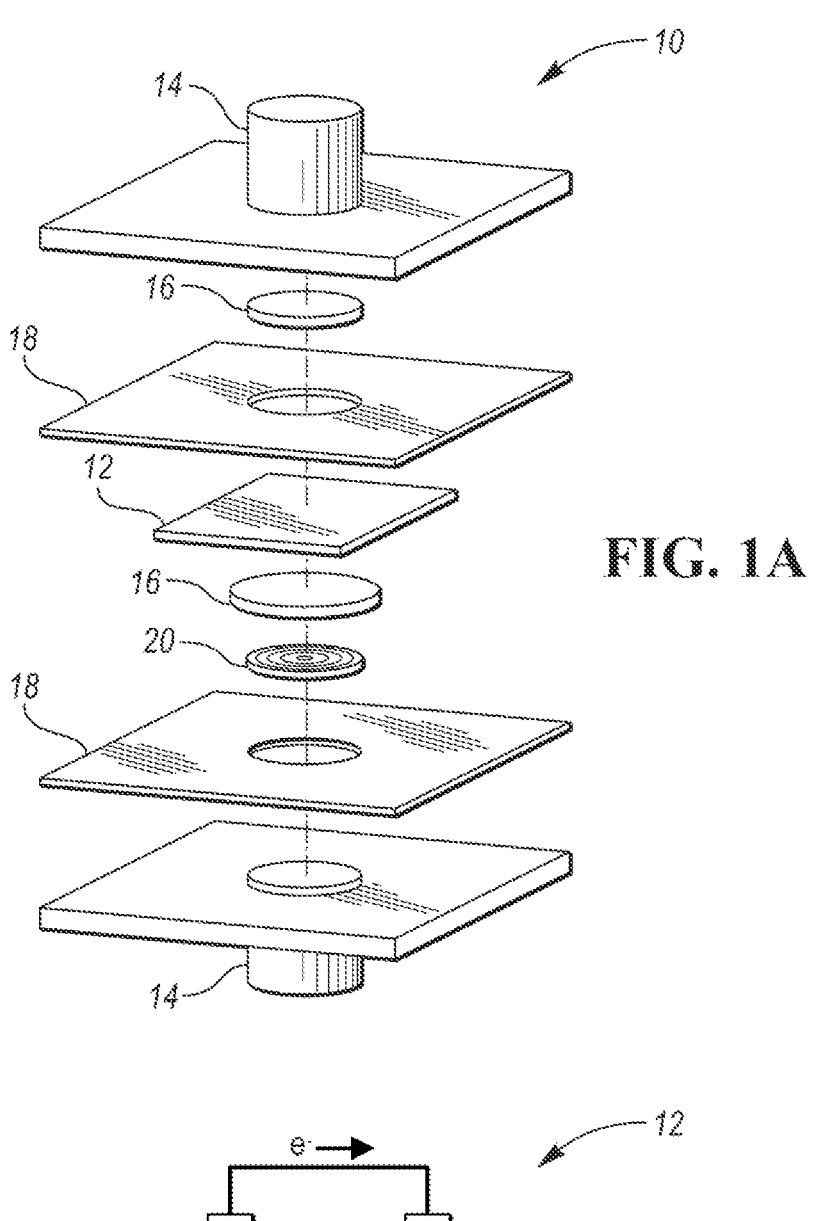
FIG. 1A shows a non-limiting example of a fuel cell and its components in an exploded view.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

As used herein, the term "substantially," "generally," or "about" means that the amount or value in question may be the specific value designated or some other value in its neighborhood. Generally, the term "about" denoting a certain value is intended to denote a range within +/−5% of the value. As one example, the phrase "about 100" denotes a range of 100+/−5, i.e. the range from 95 to 105. Generally, when the term "about" is used, it can be expected that similar results or effects according to the invention can be obtained within a range of +/−5% of the indicated value. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4, . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits. Similarly, whenever listing integers are provided herein, it should also be appreciated that the listing of integers explicitly includes ranges of any two integers within the listing.

In the examples set forth herein, concentrations, temperature, and reaction conditions (e.g., pressure, pH, flow rates, etc.) can be practiced with plus or minus 50 percent of the values indicated rounded to or truncated to two significant figures of the value provided in the examples. In a refinement, concentrations, temperature, and reaction conditions (e.g., pressure, pH, flow rates, etc.) can be practiced with plus or minus 30 percent of the values indicated rounded to or truncated to two significant figures of the value provided in the examples. In another refinement, concentrations, temperature, and reaction conditions (e.g., pressure, pH, flow rates, etc.) can be practiced with plus or minus 10 percent of the values indicated rounded to or truncated to two significant figures of the value provided in the examples.

As used herein, the term "and/or" means that either all or only one of the elements of said group may be present. For example, "A and/or B" means "only A, or only B, or both A and B". In the case of "only A", the term also covers the possibility that B is absent, i.e. "only A, but not B".

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The term "one or more" means "at least one" and the term "at least one" means "one or more." The terms "one or more" and "at least one" include "plurality" as a subset.

The description of a group or class of materials as suitable for a given purpose in connection with one or more embodiments implies that mixtures of any two or more of the members of the group or class are suitable. Description of constituents in chemical terms refers to the constituents at the time of addition to any combination specified in the description and does not necessarily preclude chemical interactions among constituents of the mixture once mixed. First definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Chemical and electrochemical systems utilizing hydrogen as a fuel source are considered the energy systems of the future either in direct hydrogen combustion engines or fuel cells. These hydrogen-producing devices are becoming increasingly popular due to their ability to produce clean energy. The systems may include fuel cells, electrolysis cells or electrolyzers, and battery cells. Fuel cells, or electrochemical cells, that convert chemical energy of a fuel (e.g. $H_2$) and an oxidizing agent into electricity through a pair of electrochemical half (redox) reactions, have become an increasingly popular hydrogen-fuel-generating technology. Fuel cells are now a promising alternative transportation technology capable of operating without emissions of either toxins or green-house gases.

Figure 1B:
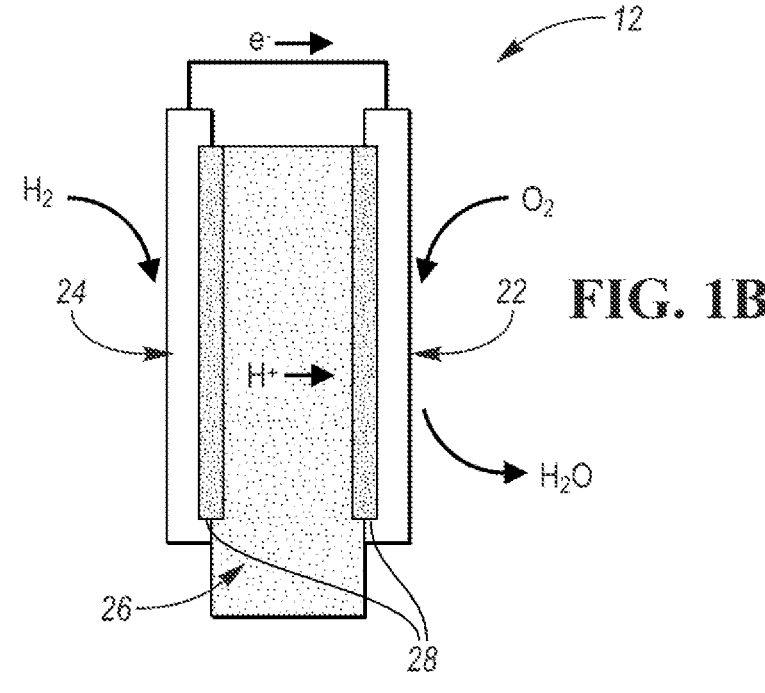
FIG. 1B shows a schematic depiction of a membrane electrode assembly (MEA) and its functioning principle.

A non-limiting example of a fuel cell, a proton-exchange membrane fuel cell (PEMFC) is depicted in FIG. 1A. A core component of the PEMFC 10 that helps produce the electrochemical reaction needed to separate electrons is the Membrane Electrode Assembly (MEA) 12. The MEA 12 includes subcomponents such as catalyst-coated cathode 22 and anode 24 electrodes separated by a proton-conductive ionomer or ionomer membrane 26; catalyst is denoted as 28 in a schematic depiction of MEA in FIG. 1B. Besides MEA 12, the PEMFC 10 typically includes other components such as current collectors 14, gas diffusion layer(s) 16, gaskets 18, and bipolar plate(s) 20.

The anode performs the hydrogen oxidation reaction (HOR)(1) while the cathode performs the oxygen reduction reaction (ORR)(2):

$$H_2 \rightarrow 2H^+ + 2e^{-s} \qquad (1)$$

$$4H^+ + O_2 + 4e^- \rightarrow H_2O \qquad (2)$$

Generally, the $H_2$ is broken down on the surface of the electrocatalyst in the anode to form protons and electrons in a hydrogen oxidation reaction (HOR). The electrons are transported through the support of the anode catalyst layer to the external circuit while the protons are pulled through the proton exchange membrane (PEM) to the cathode catalyst layer. Once in the catalyst layer, the protons move through the ion-conducting polymer or ionomer thin-film network to the electrocatalyst surface, where they combine with the electrons from the external circuit and the 02 that has diffused through the pores of the cathode catalyst layer (CCL) to form water in the oxygen reduction reaction (ORR).

Besides fuel cells, electrolyzers present another type of an electrochemical cell. Electrolyzers use electrical energy to conduct chemical reactions. Electrolyzers undergo an electrolysis process to split water into hydrogen and oxygen, providing a promising method for hydrogen generation from renewable resources. An electrolyzer, like a fuel cell, includes an anode and cathode catalyst layers separated by an electrolyte membrane. The electrolyte membrane may be a polymer, an alkaline solution, or a solid ceramic material. A catalyst material is included in the anode and cathode catalyst layers of the electrolyzer.

Besides fuel cells, the electrolyzer may be utilized in other applications including industrial, residential, and military applications and technologies focused on energy storage such as electrical grid stabilization from dynamic electrical sources including wind turbines, solar cells, or localized hydrogen production.

Figure 2A:
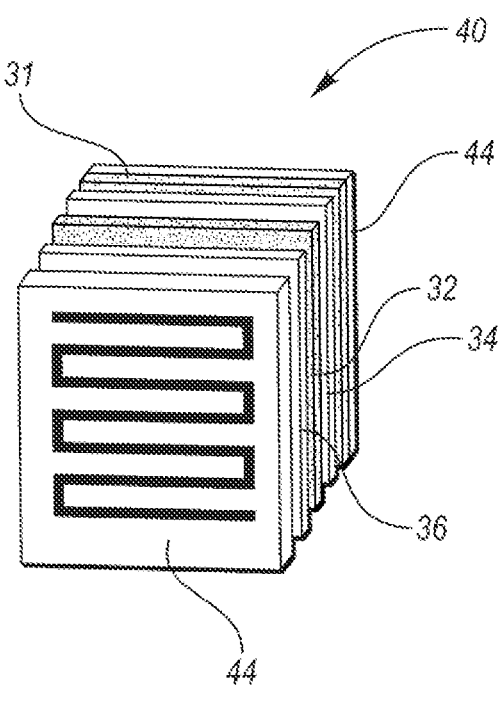
FIG. 2A shows a schematic view of a non-limiting example of an electrolyzer stack.

A typical single electrolyzer is composed of an electrolyte membrane, an anode layer, and a cathode layer separated from the anode layer by the electrolyte membrane. A non-limiting schematic depiction of an electrolyzer stack 40 is shown in FIG. 2A. The electrolyzer stack 40 includes individual electrolyzer cells 31, each of which includes the membrane 32, electrodes 34, 36, and bipolar plates (BPP) 44 with flow fields. A catalyst material, such as Pt-based catalysts, is included in the anode and cathode layers 34, 36 of the electrolyzer stack 40. At the anode layers 34, $H_2O$ is hydrolyzed to $O_2$ and $H^+$ ($2H_2O \rightarrow O_2 + 4H^+ + 4e^-$). At the cathode layers 36, $H^+$ combines with electrons to form $H_2$ ($4H^+ + 4e^- \rightarrow 2H_2$).

Figure 2B:
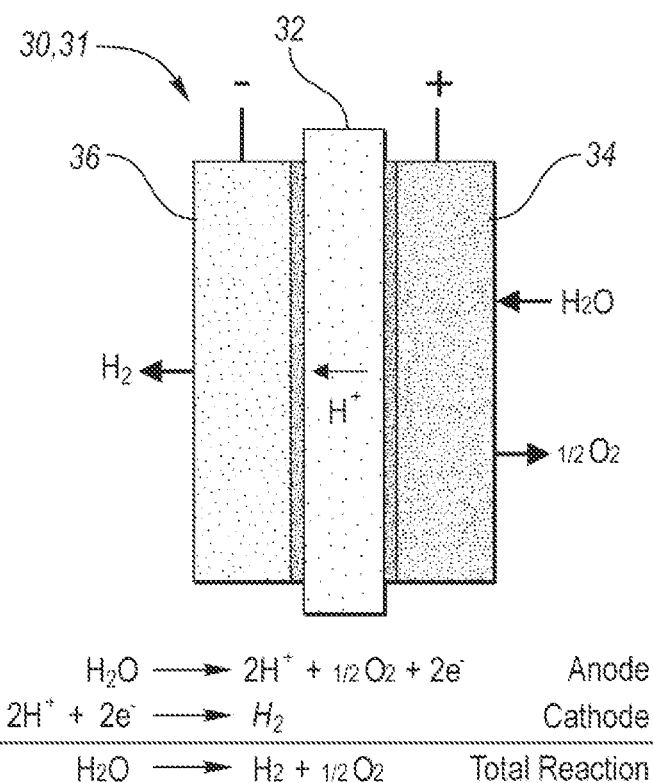
FIG. 2B is a schematic depiction of the electrolysis principle.

A depiction of the electrolysis principle, utilized by a proton exchange membrane (PEM) electrolyzer 30, with relevant reactions is depicted in FIG. 2B. The electrolyzer 30 includes the PEM 32, anode 34, and cathode 36. Each electrode includes a porous transport layer (PTL) and a catalyst layer. During electrolysis, water is broken down into oxygen and hydrogen in anodic and cathodic electrically driven evolution reactions. The reactant liquid water ($H_2O$) permeates through the anode 34 PTL to the anode catalyst layer, where the oxygen evolution reaction (OER) occurs. The protons ($H^+$) travel via the PEM 32, and electrons ($e^-$) conduct through an external circuit during the hydrogen evolution reaction (HER) at the cathode 36 catalyst layer. The anodic OER requires a much higher overpotential than the cathodic HER. It has generally been the anodic OER which determines efficiency of the water splitting due to the sluggish nature of its four-electron transfer.

The performance of electrochemical systems is typically limited by the rate of the critical reactions which are catalyzed at the electrodes. For example, in PEMFC systems, the rate limiting step is the ORR which takes place at the cathode. The reaction (2) or ORR is much more kinetically hindered than reaction (1) and thus acts as the rate limiting step. To compensate for the sluggish kinetics, the electrode is typically loaded with a substantial quantity of precious-metal catalyst, increasing the overall cost of the device. Reaction (2) is thus typically catalyzed by precious metal catalysts and alloys such as Pt, Pt—Co, Pt—Ni, or the like. Yet the catalysts represent a significant expense and increasing the reaction rate by including a greater amount of the catalyst is too costly and impractical.

Therefore, there is a need to develop an alternative way to increase the slow kinetics of the reactions performed at the electrochemical cell electrodes.

In one or more embodiments, an electrochemical cell or system is disclosed. The cell/system may be any electrochemical cell/system limited by catalyzed reaction(s) described above. The cell/system may include a PEMFC, PEM electrolyzer, anion-exchange membrane fuel cell, anion-exchange membrane electrolyzer, or bipolar-membrane based cell. While the reaction sequences in some of these systems may be different from PEM since the membrane transports $OH^-$ instead of $H^+$, the magnetic electrocatalyst and electromagnet principles described herein to accelerate catalyzed reactions at the electrodes are applicable.

The cell/system includes an anode, a cathode, and a membrane positioned between the electrodes. The cell/system also includes an electrolyte in the membrane. The cell/system includes ionomer in the membrane, electrode catalyst layer(s), or both. The cell also includes an external electrical circuit, flow fields, and BPPs. The cell also includes additional components described below such as a magnetic electrocatalyst and an electromagnet.

The membrane may be a PEM, an anion-exchange membrane, or a bipolar-membrane.

The cathode, anode, electrode may include one or more materials. The electrode(s) may each include a substrate. The substrate may be carbon. The carbon substrate may have a plurality of forms and variations such as graphite, graphene, nitrogen-doped graphite, carbon black, electro-conductive carbon black, activated carbon fibers, fullerenes, nanotubes, nanofibers, the like, or a combination thereof. The substrate may include amorphous and crystalline formations. The substrate may be a porous substrate having a plurality of pores including macropores, mesopores, and/or micropores. The substrate may thus include an outer non-porous surface and pores dispersed within the non-porous surface and having a variable depth and diameter. Alternatively, the support may be a metal oxide or metal such as cobalt oxide, aluminum oxide, titanium oxide, the like, or a combination thereof. The support material may have a variety of morphologies and desirable properties such as high surface area, conductivity, low grit content, the like, or a combination thereof.

The electrode(s) are catalyzed electrode(s). The electrode(s) may include one or more electrocatalysts. The cathode electrocatalyst(s) may include precious metal catalysts such as platinum (Pt), palladium (Pd), or their combination. The anode electrocatalyst(s) may include iridium (Ir), ruthenium (Ru), or both.

The cathode may include a magnetic electrocatalyst/catalyst. The magnetic electrocatalyst may be magnetized permanently or temporarily. The magnetic electrocatalyst may include a magnetic alloy including one or more ferro-magnetic or superparamagnetic materials such as iron (Fe), cobalt (Co), nickel (Ni), or neodymium (Nd). The ferromagnetic or superparamagnetic material may be included in a form of an alloy such as Pt—Co, Pt—Fe, Pt—Ni, Pt—Nd, Pd—Fe, Pd—Ni, Pd—Nd, Ir—Co, Ir—Fe, Ir—Ni, Ir—Nd, Ru—Co, Ru—Fe, Ru—Ni, Ru—Nd, or their combination. The magnetic electrocatalyst may thus be included in the cathode as part of an electrocatalyst alloy.

The magnetic electrocatalyst may be, also or alternatively, included as a non-magnetic catalyst combined with a magnetic material. The catalyst may include an alloy such as PtM or PdM alloy, where M is a transition, non-ferromagnetic metal such as Mn, Ti, Al, Cu, Ru, Mo, etc. The catalyst may include Ir-M or Ru-M alloy where M is one of the aforementioned elements, or an oxide of the above. In some embodiments, the catalyst may primarily include Ni, Cu, Co, their oxides, or a combination thereof.

Such non-magnetic catalyst may be combined with a magnetic material. The magnetic material may include Co, Fe, Ni, Nd, or their combination. The magnetic material may include particles, beads, clusters. The particles may be nanoparticles, nanobeads, nanoparticle clusters, nanochains. Non-limiting example nanoparticles may measure about 1-10, 2-8, or 3-6 nm. The particles may be all-metallic or include a metallic core and a non-metallic outer layer. The magnetic nanoparticles/core may include $Fe_2O_3$, $Fe_3O_4$, FeC, the like, or their combination. The outer layer may include silica, graphene, and/or another material. The non-magnetic catalyst may form an outer shell surrounding the magnetic nanoparticles/cores or magnetic nanoparticles with cores and outlet layer(s).

The magnetic electrocatalyst may be dispersed through-out the cathode layer evenly, regularly, symmetrically, homogenously, randomly, asymmetrically, or non-homog-enously. The magnetic electrocatalyst loading may be lower, higher, or equal to non-magnetic electrocatalyst loading. In a non-limiting example, about 1-80, 10-70, or 20-60 wt. % of the electrocatalyst, based on the total weight of the electrocatalyst in the electrode may be magnetic. About 1, 5, 10, 15, 20, 25, 30, 35, 40, 45, 50, 55, 60, 65, 70, 75, or 80 wt. % of the electrocatalyst, based on the total weight of the electrocatalyst may be magnetic. The remainder may be non-magnetic.

The magnetic electrocatalyst may be selectively heated. The heating may be conducted by an oscillating magnetic field. The magnetic electrocatalyst may be the only part of the cell/system which is being heated by the magnetic field. The system/cell thus includes a mechanism by which a local hot spot including the electrocatalyst is created while the remainder of the system maintains lower temperature than the local hot spot.

The same principals may apply to electrocatalyst material in the anode layer. The anode may include a magnetic electrocatalyst. Each the cathode and anode may include one or more magnetic electrocatalysts such that reactions at both electrodes may be accelerated by the systems and methods described herein. Both electrodes may include magnetic electrocatalyst hot spots where heating may be activated by the same electromagnet present in the system/cell. The chemical composition of the electrocatalysts in each elec-trode may be different.

The electrode may include an ionomer as part of a porous catalyst layer. The ionomer may bind and cover the elec-trocatalyst particles and provide transport pathways for the ions and reactants. Additionally, the cell/system may include one or more ionomers in the membrane as a PEM or cation-conducting solid electrolytes.

The ionomer may include one or more materials. Non-limiting examples of the ionomer include Nafion™ or sulfonated tetrafluoroethylene based fluoropolymer-copoly-mer, a high-oxygen permeability ionomer (HOPI), nonfluo-rinated arene-based polymers such as poly(arylene sulfone), or their combination. A non-limiting example of the hydro-phobic backbone may include polytetrafluoroethylene (PTFE) and the hydrophilic, polar sidechains may include sulfonate.

The cell may also include a magnet. The magnet may be an electromagnet. The magnet may be an alternating current (AC) magnet. The magnet may be an integral part of one or more components of the cell. In a non-limiting example, the magnet may be incorporated into an outer housing, outer enclosure, a BPP, a flow field, or a combination thereof. The magnet may be located adjacent, directly adjacent, aligned with, facing, opposite the cathode layer including the mag-netic electrocatalyst. In a non-limiting example, the electro-magnet may be an antenna printed onto a BPP or flow field. The electromagnet may be positioned, arranged, structured such that the magnetic electrocatalyst material is within a range of a magnetic oscillating field generated by the electromagnet.

The magnet may be a source of an oscillating magnetic field. The magnetic field may be an AC magnetic field. The magnet may be structured to be turned on and off, for example based on predetermined frequencies or conditions within the cell. For example, the magnet may be turned on when the cell is starting up, when the power is to be increased, under normal operating conditions defined herein, or their combination. In a non-limiting example, the magnet may be turned off when the cell is overheating.

The system/cell may include one or more controllers, sensors, or both. The one or more controllers may have one or more processing components such as one or more micro-processor units which enable the controllers to process input data. The one or more controllers may be programmed to operate the electrocatalyst heating mechanism: the magnet, the magnetic oscillating field, the magnetic electrocatalyst material. The one or more controllers may be programmed to determine a threshold value to initiate heating, maintain heating, and/or terminate heating of the electrocatalyst. The threshold value may be based on the temperature of one or more components of the cell/system. The one or more components may include the cathode, the electrocatalyst, the electrolyte, the ionomer, the anode, the like, or a combina-tion thereof. The threshold value may be also based on the cell output, operating conditions such as startup, shut down, normal operating conditions defined herein.

The one or more controllers may be programmed to maintain the electrocatalyst temperature within a predeter-mined range, maintain temperature of the remainder of the cell at a lower temperature or temperature range than the electrocatalyst temperature, or both. The electrocatalyst tem-perature may relate to a temperature of the electrocatalyst only or also a temperature of the cathode including the electrocatalyst.

The one or more controllers may be programmed to control, maintain, adjust, alter the temperature of the elec-trocatalyst to prevent overheating of the electrocatalyst, cathode, or cell from exceeding the predetermined threshold. The adjusting or altering may include single or multiple instances of adjustment. The adjusting may occur in regular or irregular intervals, based on the input received from the one or more sensors.

The sensors may include one or more types of sensors. The sensors may be structured to measure temperature of the electrocatalyst, cathode, anode, membrane, electrolyte, ionomer, flow field, BPP, or their combination. The sensors may be installed in various locations throughout the cell for example adjacent a target part of the cell for which temperature reading should be assessed.

The one or more controllers may be programmed to turn the electromagnet on/off, to active and/or deactive the electromagnet, in response to input from one or more sensors, derive data based on the input, or both. In a non-limiting example, the one or more sensors may be structured to measure temperature within the cell, catalyst, or both, and provide the temperature input to the one or more controllers. Based on one or more conditions such as the value of the temperature(s), output of the cell, and/or additional data or inputs, the one or more controllers may active or deactive the magnet.

Activating the magnet generates an oscillating electromagnetic field which causes increase of the electrocatalyst's temperature. Because the magnetic field's effect is limited to the ferromagnetic material, only the electrocatalyst is affected since the electrocatalyst includes the ferromagnetic material while the remaining components of the cell do not. The system/cell may be ferromagnetic-material free except for the electrocatalyst. The heating thus causes formation of localized hot spots within the electrode, cell, system. The heating is thus selective, limited, or exclusive to the hot spots. The remainder of the cell/system is not affected by the temperature increase. Exceptions may exist for residual heat being emitted from the heated electrocatalyst to the area surrounding the electrocatalyst. In some cases, areas of the cathode or cathode layer may have residual heat emitting from the hot spots. The residual heat should not negatively affect or degrade the electrolyte, ionomer, and/or other temperature-sensitive components of the cell/system.

Regarding the hot spots, when the electromagnet is activated, the oscillating electromagnetic field may increase temperature of the magnetic electrocatalyst material to a first temperature, forming one or more localized hot spots within the electrode. When the electromagnet is deactivated, the oscillating electromagnetic field may cease or stop to increase temperature of the magnetic electrocatalyst material. The magnetic electrocatalyst material may then cool down and have a second temperature, which is lower than the first temperature.

The first temperature may have a value or range which is beneficial for acceleration of the reactions at the electrode(s) such as ORR, removal of liquid water or frozen water from the electrode, or both. The first temperature may be reserved only for the hot spots such that it is higher than a temperature of the remainder of the cell, especially of the temperature-sensitive components such as the electrolyte or ionomer. The first temperature may be a predetermined temperature or a predetermined value or range. The first temperature may be lower than a temperature at which the electrocatalyst would experience degradation.

The kinetics of the above-mentioned reactions obey a conventional Arrhenius rate law, the rate of the reactions increases exponentially with temperature. For example, increasing the temperature of reaction (2) catalyzed by a state-of-the-art Pt catalyst by 20° C. corresponds to an approximately 70% increase in the reaction rate constant. Thus, increasing temperature is desirable because the higher the temperature of the electrocatalyst, the greater the reaction rate or the faster the reactions. Yet, typically, when reaction temperature is increased to battle the sluggish kinetics of the reactions which drive the system, the system components such as the electrolyte, ionomer suffer unwanted degradation. The upper temperature limit of the system is thus typically lower than what the electrocatalyst may benefit from because of the temperature-sensitive portions of the system.

Such traditionally-occurring problem is overcome in the herein-disclosed system, which creates a hot spot of the increased temperature at the catalyst without negatively influencing temperature-sensitive portions of the system such as the electrolyte, as was described above. Kinetic limitations of the ORR can thus be at least partially alleviated by magnetically heating the cathode catalyst within the cell without negatively affecting the remainder of the cell. The magnetic heating of the catalyst may be also utilized to remove liquid water or frozen water from the electrode(s).

Figure 3:
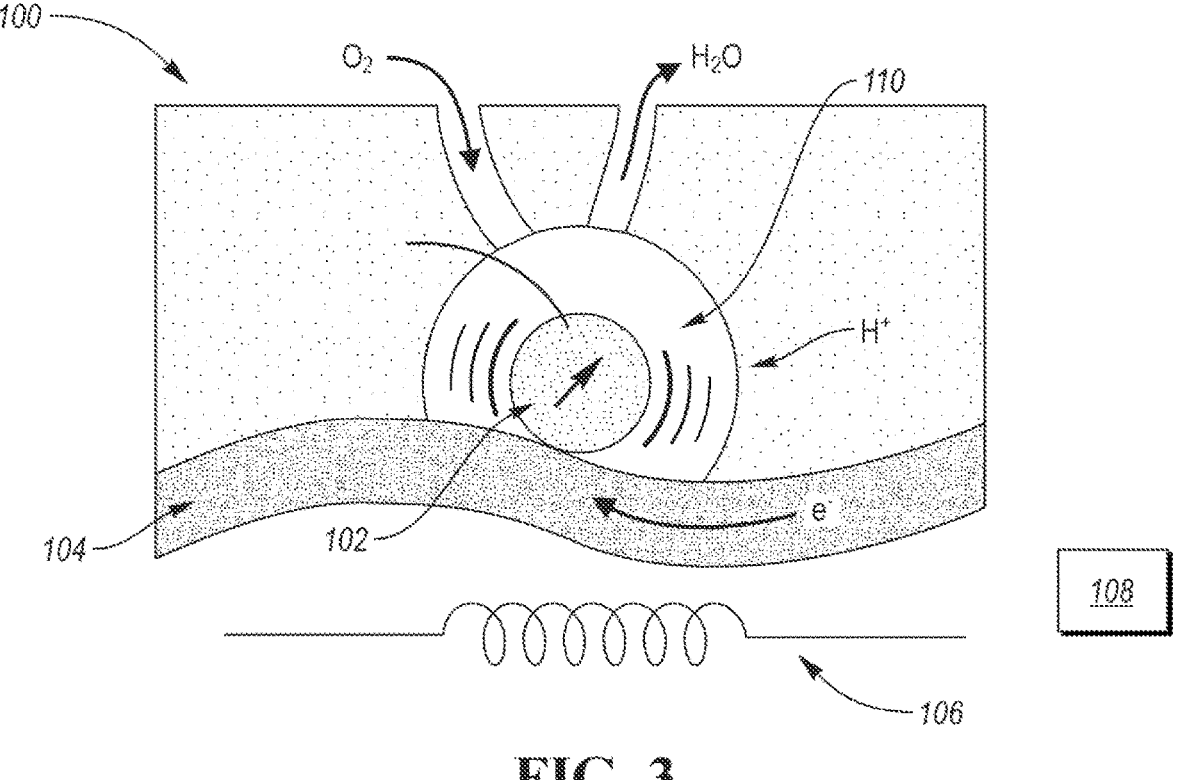
FIG. 3 is a schematic depiction of the localized heating concept via magnetic hyperthermia.
Figure 4A:
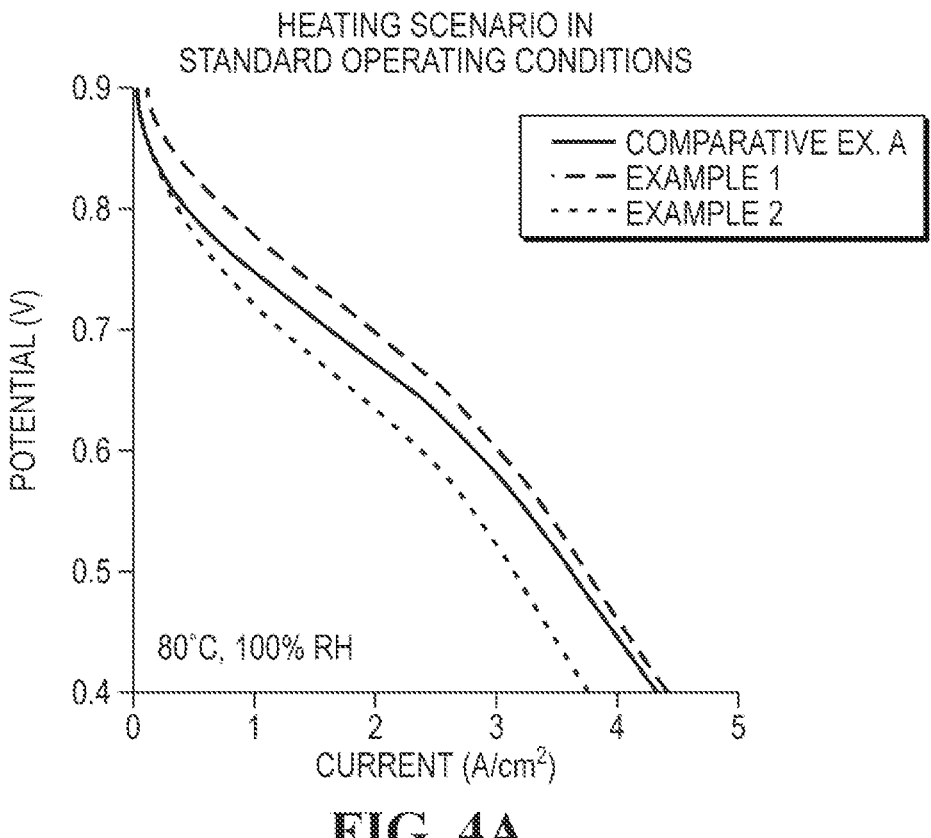
FIGS. 4A and 4B show non-limiting examples of heating scenarios in standard operating conditions of an electrochemical cell.
Figure 4B:
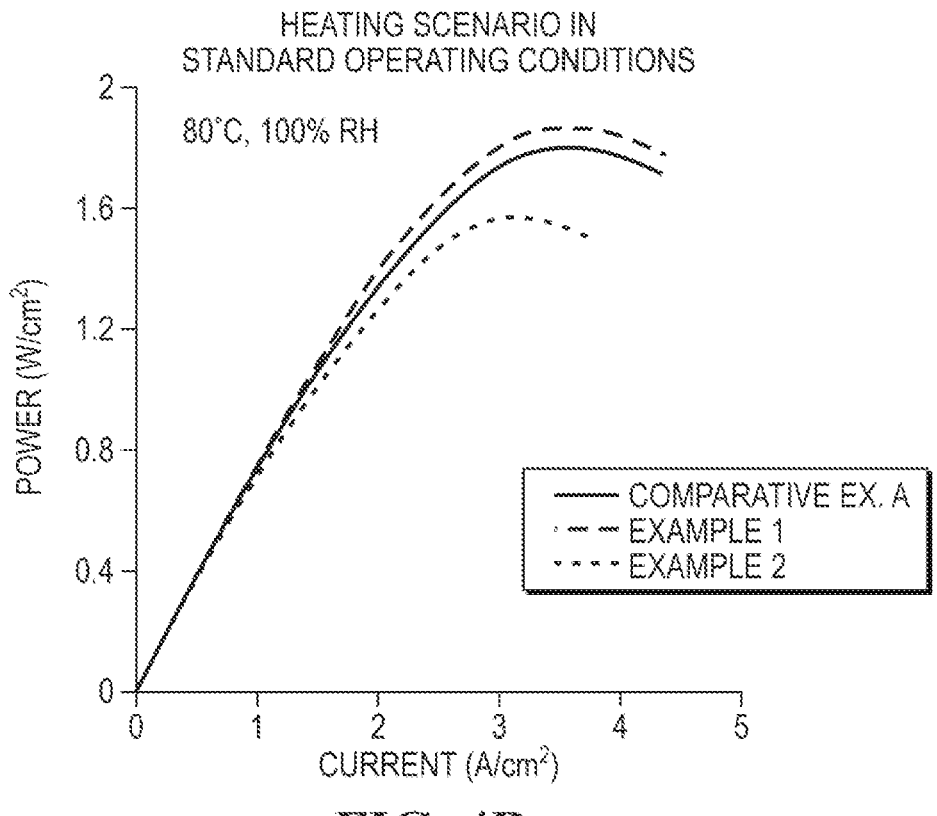
Figure 4C:
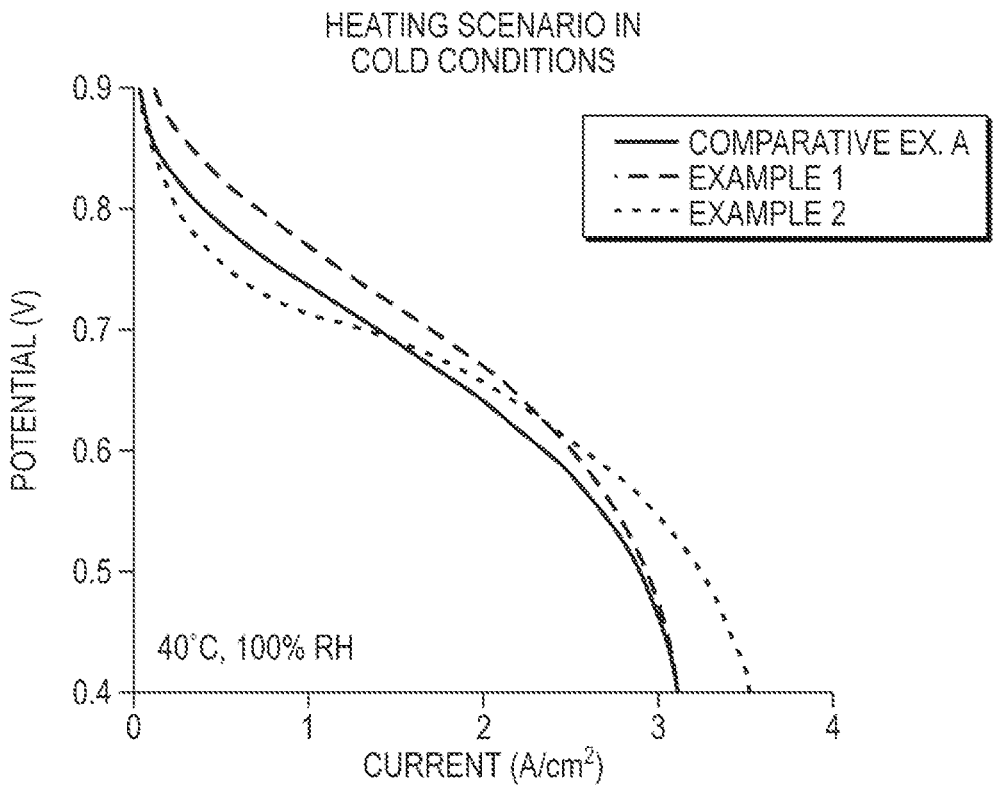
FIGS. 4C and 4D shows non-limiting examples of heating scenarios in cold conditions.
Figure 4D:
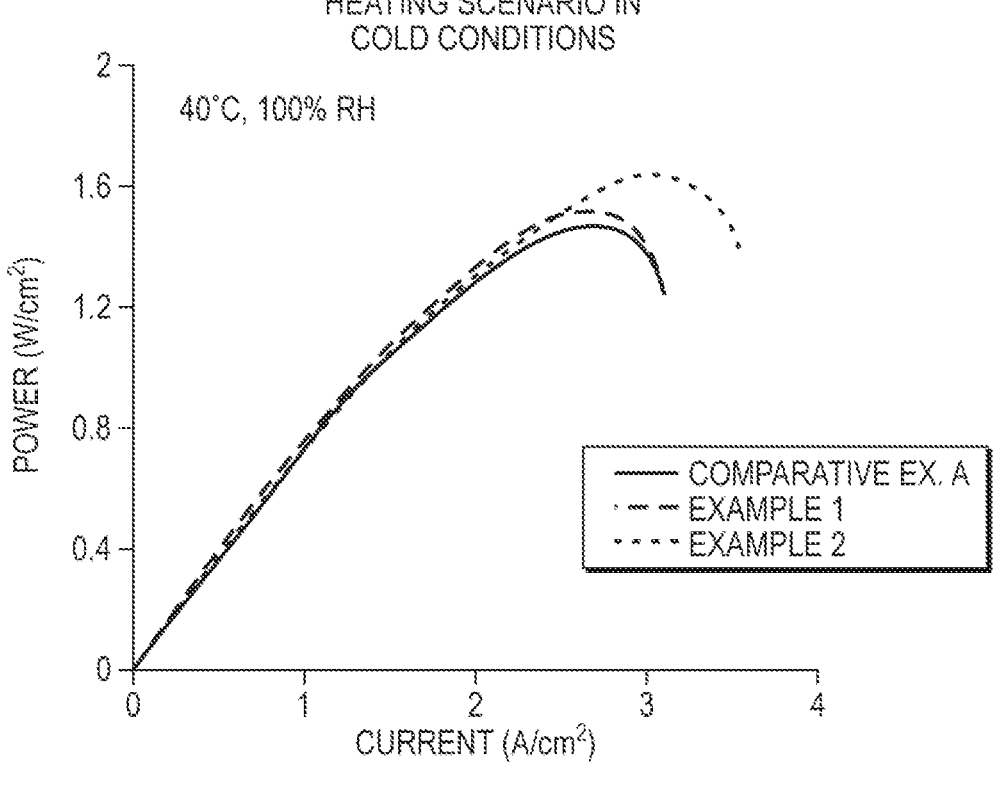

The magnetic heating is primarily localized to the electrode with the degree of heat transfer from the magnetic electrocatalyst to the surrounding support and electrolyte materials dictating the operating conditions in which the magnetic heating is beneficial. Schematic of magnetically-heated hot spot is shown in FIG. 3. FIG. 3 shows schematically a portion of the electrochemical cell 100 having an electrocatalyst 102, which is magnetic, as part of the electrode 104. The cell 100 also includes a magnet 106 which may be activated and deactivated, as was described herein. The cell 100 further includes one or more controllers 108 programmed to turn the magnet 106 on and off. The oscillating magnetic field generated by the magnet 108 creates the localized hot spot 110. The hot spot's increased temperature increases activity of the electrocatalyst and increases rates of the catalyzed reactions at the electrode 104 or removes water from the electrode 104.

The cell thus implements magnetic hyperthermia, where heat may be locally dissipated in a magnetic electrocatalyst subjected to an oscillating magnetic field. This localized heating of the electrocatalyst accelerates electrode kinetics without excessively heating the electrolyte, improving overall device performance under a number of operating conditions. The localized heating of the electrocatalyst may also or alternatively remove any unwanted, excess water present in the electrode(s).

The heating may be localized to the catalyst electrocatalyst or be dispersed homogenously to the cathode layer (such as a layer including support and electrolyte adjacent to the electrocatalyst).

The oscillating field may have a frequency of up to about 300, 400, or 500 kHz. The oscillating field may have a frequency of about 1-500, 50-450, or 100-400 kHz. The oscillating field may have magnitude of up to about 50, 55, 60, 65, 70, 75, 80, 85, 90, 95, or 100 mT. The heating may be accomplished using hysteretic dissipation, Neel dissipation, or both, depending on whether the magnetic material has a non-zero magnetic coercivity.

The inclusion of the magnetic electrocatalyst and the oscillating magnetic field may accelerate reaction kinetics, improve overall performance under standard operating conditions described herein, cold conditions described herein, or both, improve the maximum power output of the cell under cold conditions, to start the electrochemical cell operation from frozen conditions or freeze start, where in addition to accelerating the electrochemical reaction kinetics, the heating may help to melt/evaporate any crystalline or liquid water in the vicinity of the catalyst later, or a combination thereof.

A method of increasing reaction rates of one or more reactions in an electrochemical cell is disclosed herein. The method may include accelerating electrode kinetics without excessively heating electrolyte, ionomer, or both. The method may include improving overall device performance under a number of operating conditions named herein.

The method may include subjecting one or more portions of the cell/system to an oscillating magnetic field. The one or more portions may include magnetic electrocatalysts(s). The method may include generating localized heating of and/or around the magnetic electrocatalyst(s).

The method may include turning an electromagnet on in response to input from one or more sensors. The method may include generating an electromagnetic field. The method may include selectively increasing temperature within the cell/system by the electromagnetic field. The method may include creating one or more hot spots in the electrode(s) having a first temperature. The method may include maintaining temperature of the one or more hot spot(s) within a predetermined, target range or value.

The method may include creating localized heating of the electrocatalyst(s), dispersed heating within an electrode, or both. The dispersed heating may include heating within an electrode layer such as a layer including support and electrolyte adjacent to the magnetic electrocatalyst.

The method may include turning the electrogene off in response to input from one or more sensors and/or additional data or inputs. The method may include terminating the electromagnetic field and thus lowering temperature of the one or more hot spots. The method may include bringing the temperature of the cooling electrocatalyst to a second temperature defined herein.

EXPERIMENTAL SECTION

Examples 1, 2 and Comparative Example A

The simulated impact of the heating scenarios on the full cell performance is shown in FIGS. 4A-4D for two examples and one comparative example for two representative operating conditions: standard operating conditions (4A, 4B) and cold conditions (4C, 4D). The standard operating conditions relate to about 80° C. and about 100% relative humidity (RH) at the flow channel. The cold conditions relate to about 40° C. and about 100% relative humidity (RH) at the flow channel.

The scenarios are representative of the impact of localized and dispersed heating on the performance of an electrochemical cell.

In the reference case of the Comparative Example A, no heating was applied. The Comparative Example A scenario refers to a baseline case of no magnetic heating.

Example 1 was the localized scenario, for which it was assumed that the magnetic heating was localized to the catalyst alone, leading to an effective temperature of the catalyst 40° C. above that of its surroundings. Example 1 scenario refers to minimal heat transfer from the catalyst to the support and electrolyte.

Example 2 was the dispersed case, in which the entire cathode layer, including the carbon support and adjacent electrolyte, was homogeneously heated to bring the steady-state temperature maximum at the cathode to about 95° C. under standard operating conditions (4A, 4B) or about 75° C. under cold conditions (4C, 4D). Example 2 refers to homogeneous heating throughout the cathode layer.

As can be seen from the simulations, localized heating resulted in a moderate improvement in performance under all conditions and voltages, while dispersive heating improved the maximum power output of the cell under cold conditions.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. An electrochemical cell comprising:
   a membrane;
   a catalyzed electrode facing the membrane, the electrode including a magnetic electrocatalyst in contact with an ionomer;
   an electromagnet; and
   a controller programmed to activate the electromagnet to form an oscillating magnetic field arranged to selectively and locally increase a temperature of the magnetic electrocatalyst to a predetermined temperature, forming one or more hot spots within the electrode based on one or more conditions, to increase kinetics of a reaction at the catalyzed electrode or remove water from the electrode, wherein the hot spots have a temperature higher than that of the ionomer.

2. The electrochemical cell of claim 1, wherein the one or more conditions include cell temperature, cell output, or both.

3. The electrochemical cell of claim 1, wherein the electromagnet is an alternating current magnet.

4. The electrochemical cell of claim 1, wherein the magnetic electrocatalyst is dispersed within the electrode in a uniform manner.

5. The electrochemical cell of claim 1, wherein the electrode is an anode.

6. The electrochemical cell of claim 1, wherein the cell is a proton-exchange membrane fuel cell (PEMFC).

7. The electrochemical cell of claim 1, wherein the electrode further comprises a non-magnetic electrocatalyst.

8. The electrochemical cell of claim 1, wherein the magnetic electrocatalyst is an oxygen reduction reaction (ORR) catalyst.

9. An electrochemical system comprising:
a cell including:
an anode and a cathode separated by a membrane including an ionomer; the cathode including a magnetic electrocatalyst;
an electromagnet; and
a controller programmed to operate the electromagnet, responsive to the cell output, to selectively increase, decrease, and/or maintain the electrocatalyst temperature to accelerate cathodic reactions.

10. The electrochemical system of claim 9, wherein the magnetic electrocatalyst is dispersed within the cathode in a uniform manner.

11. The electrochemical system of claim 9, wherein the cathode further includes a non-magnetic electrocatalyst.

12. The electrochemical system of claim 9, wherein the selective temperature includes the increase and the increase generates one or more localized hot spots having a higher temperature than a remainder of the cell.

13. The electrochemical system of claim 9, wherein the controller is further programmed to compare the cell output to a predetermined threshold and to activate the electromagnet when the cell output falls below the threshold.

14. The electrochemical system of claim 9, wherein the controller is programmed to intermittently activate the electromagnet during transient startup conditions, low-temperature operation, or freeze-start scenarios, based on real-time cell output data.

15. An electrochemical cell comprising:
a selective hot-spot forming system including:
an electromagnet arranged to form an oscillating electromagnetic field; and
an electrode arranged within a radius of the oscillating electromagnetic field and having a magnetic electrocatalyst material whose temperature depends on a status of the electromagnet such that
when the electromagnet is activated, the oscillating electromagnetic field increases the temperature of the magnetic electrocatalyst material to a first predetermined temperature, forming one or more localized hot spots within the electrode, and
when the electromagnet is deactivated, the oscillating electromagnetic field ceases to increase the temperature of the magnetic electrocatalyst material and the magnetic electrocatalyst material has a second temperature, the predetermined first temperature being higher than the second temperate.

16. The electrochemical cell of claim 15, wherein the first temperature is higher than a temperature of an ionomer present in the cell.

17. The electrochemical cell of claim 15, wherein the first temperature value is exclusive to the hot spots.

18. The electrochemical cell of claim 15, wherein the electrode is a cathode.

19. The electrochemical cell of claim 15, wherein the predetermined temperature is maintained by a controller configured to activate or deactivate the electromagnet based on input from one or more temperature sensors positioned in the cell.

20. The electrochemical cell of claim 15, wherein the predetermined temperature is maintained within a range of about 20° C. to 60° C. above a baseline operating temperature of the electrode.

* * * * *